United States Patent [19]

Barrett et al.

[11] Patent Number: 4,857,811

[45] Date of Patent: Aug. 15, 1989

[54] EVACUATION PUMP CONTROL FOR A CENTRIFUGE INSTRUMENT

[75] Inventors: Lawrence R. Barrett, Brookfield, Conn.; Ronald C. Robertson, Wilmington, Del.; Mark A. Sullivan, Woodbury, Conn.

[73] Assignee: E. I. Du Pont De Nemours and Company, Wilmington, Del.

[21] Appl. No.: 175,823

[22] Filed: Mar. 31, 1988

[51] Int. Cl.[4] .......... H02D 5/06

[52] U.S. Cl. .......... 318/3; 494/10; 494/26; 388/933; 388/930

[58] Field of Search .......... 494/10, 26; 318/301, 318/327, 313, 332, 3

[56] References Cited

U.S. PATENT DOCUMENTS

| | | | |
|---|---|---|---|
| 3,300,129 | 1/1967 | Brunati | 494/10 |
| 3,347,453 | 10/1967 | Goergen | 494/10 |
| 3,623,657 | 8/1970 | Trump | 494/10 |
| 3,783,359 | 1/1974 | Malkel | 318/254 |
| 3,957,197 | 5/1976 | Sartory et al. | 494/10 |
| 4,152,254 | 5/1979 | Steier et al. | 494/2 C X |
| 4,244,513 | 1/1981 | Fayer et al. | 318/30 L X |
| 4,450,391 | 5/1984 | Hara | 318/313 |
| 4,551,715 | 11/1985 | Durbin | 340/671 |
| 4,601,696 | 7/1986 | Kamm | 494/10 |
| 4,700,117 | 10/1987 | Giebeler et al. | 318/327 |
| 4,772,254 | 9/1988 | Grassi et al. | 494/10 |

*Primary Examiner*—Benjamin Dobeck

[57] ABSTRACT

A centrifuge instrument has a vacuum pump responsive to a rotor recognition arrangement. The pump is operative to provide a predetermined pressure level in the chamber compatible with which one of a plurality of rotors is mounted within the chamber. The requested angular velocity can also be used to control the pressure level in the chamber.

4 Claims, 1 Drawing Sheet

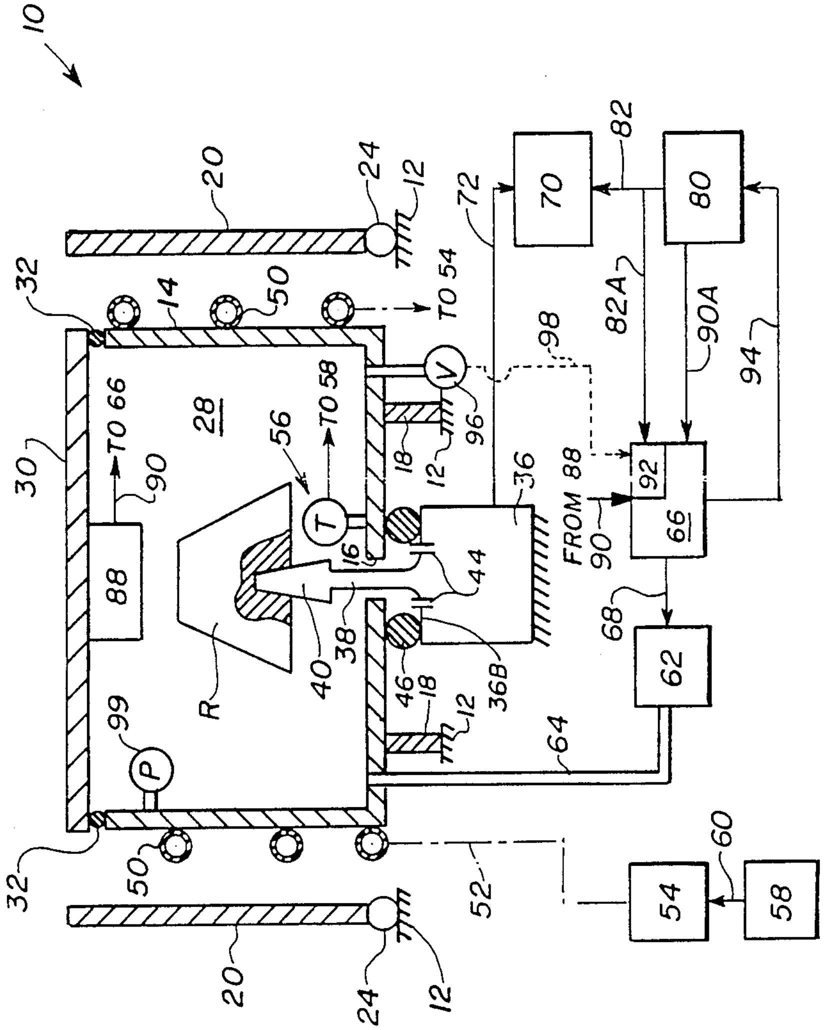
10
20
24
12
32
14
50
TO 54
72
70
82
80
30
TO 66
90
28
56
TO 58
T
V
98
82A
90A
94
18
96
36
FROM 88
92
66
88
R
16
44
40
38
46
36B
68
62
99
P
64
52
54
60
58

EVACUATION PUMP CONTROL FOR A CENTRIFUGE INSTRUMENT

BACKGROUND OF THE INVENTION

1. Field of the Invention

The present invention relates to centrifuge instruments and in particular, to a centrifuge instrument operable in either an evacuated or a non-evacuated environment.

2. Description of the Prior Art

Current centrifuge instruments can be divided into two basic types—those that operate with the chamber at atmospheric pressure and those that operate with the chamber evacuated to a pressure lower than atmospheric. In general, lower centrifugal force applications are performed in a centrifuge where the chamber is at atmospheric pressure. An example of such an instrument is the RC-5C Centrifuge marketed and sold by the Medical Products Department of E. I. du Pont de Nemours and Company, Inc. This type of centrifuge is inherently simpler, less expensive and more reliable than a centrifuge whose chamber is evacuated. There is no vacuum pump nor are plural seals necessary to isolate the chamber from atmospheric conditions. This means fewer parts, less strict machining tolerances and less maintenance concerns. Additionally, the rotors, tubes and bottles used in this type of centrifuge are also inherently simpler and less expensive in that no seals are required to isolate the sample in its container from a vacuum environment. For all these reasons, operation at atmospheric pressure is generally considered to be the preferred method of operation.

However, operation at atmospheric pressure has some limitations. A rotating body in a non-evacuated environment creates windage. This windage has two detrimental effects on centrifuge performance. First, windage opposes the drive torque and as such acts to limit the maximum angular velocity of a rotor. Eventually, a point is reached where the windage (and other viscous losses such as bearing losses) equals the drive torque output from the motive source. At this point none of the applied torque is used to accelerate the rotor thereby limiting the angular velocity of the rotor. Limiting the angular velocity of the rotor also limits the centrifugal force to which the sample can be exposed as relative centrifugal force (RCF) is a function of its radius and the square of the angular velocity of the rotor. Second, windage creates heat that tends to elevate the temperature of the sample. While, in general, centrifuges have a cooling system to control sample temperature, this cooling system has a predetermined capacity. The heat generated by windage must never exceed the cooling capacity of the centrifuge temperature control system.

In order to reduce windage and these limitations imposed by the same other centrifuge instruments operate with the chamber evacuated. An example of such an instrument is the OTD Ultracentrifuge instrument marketed and sold by the Medical Products Department of E. I. du Pont de Nemours and Company, Inc. These instruments are generally used only for high centrifugal force applications for reasons generally opposite to those described above as advantages for the non-evacuated chamber system. The chamber is always evacuated during operation of the centrifuge instrument. Evacuation creates stresses on the framework of the centrifuge and the seals which isolate the chamber from atmospheric conditions. These stresses create the need for periodic maintenance especially for the seals and the vacuum pump.

It is believed advantageous to provide a centrifuge that is operable in an evacuated environment in order to create high centrifugal forces and also operable in a non-evacuated environment in order to use the less expensive, less complex rotor, tube and bottle systems. It is also believed to be advantageous to minimize the use of the evacuation to only those applications specifically requiring the same in order to minimize the stress placed on the seals and the maintenance associated therewith. Further, it is believed to be advantageous to provide an instrument that can automatically control the pressure in the chamber based on the identity of the rotor loaded onto the drive and the requested run parameters.

SUMMARY OF THE INVENTION

The present invention relates to a centrifuge instrument having a support framework upon which a rotor chamber, or bowl, is disposed. A drive motor is mounted to the framework and includes a drive shaft which projects into the chamber. The chamber is closeable by a suitable door or cover. A vacuum pump for evacuating the interior of the chamber is in operative communication therewith.

The upper end of the drive shaft is configured to accept any one of a predetermined plurality of rotor elements. Each rotor element is itself designed for operation in either an evacuated or a non-evacuated environment. Accordingly, a rotor recognition device is provided in a predetermined operative location within the chamber of the centrifuge and is operative to provide a signal representative of the identity of which of the plurality of possibly usable rotors is mounted on the drive shaft. The pump is responsive to the signal representative of the identity of the rotor for generating a predetermined pressure level on the interior of the chamber in accordance with the particular rotor disposed therein. Alternatively, means are provided whereby the signal representative of the identity of the rotor may be generated by the operator.

In addition, means are provided whereby an operator may request a predetermined angular velocity to which the rotor is to be driven. The signal representative of this requested angular velocity is also applied to the pump control system and is used thereby to control the predetermined pressure level of the chamber.

BRIEF DESCRIPTION OF THE DRAWINGS

The invention will be more fully understood from the following detailed description thereof taken into connection with the accompanying drawings which form a part of this application and in which:

The sole FIGURE is a highly stylized pictorial representation of a centrifuge instrument in accordance with the present invention.

DETAILED DESCRIPTION OF THE INVENTION

The centrifuge instrument 10 in accordance with the present invention includes a superstructure schematically indicated at reference character 12 formed of suitable plates, struts and shell pieces which together cooperate to define the framework which supports and encloses the operative elements of the instrument. The centrifuge instrument 10 includes a bowl 14, having a central aperture 16 is the floor thereof. The bowl 14 is supported within the framework 12 on a standoff ring 18 and is surrounded by one or more guard rings 20. The guard rings serve to confine the fragments produced by any potential catastrophic failure of a rotor spun within the centrifuge. It is preferred that the guard ring 20 be movably arranged with respect to the framework 12 and for this purpose rollers 24 are schematically illustrated. The interior of the bowl 14 defines a volume 28 which is enclosed by a removable lid or cover 30. The undersurface of the lid or cover 30 is provided with a suitable vacuum seal 32 arrangement such as that disclosed and claimed in copending application Ser. No. 926,180, filed Nov. 3, 1986, (IP-0642).

A drive motor generally indicated by the reference character 36 is disposed on the framework 12 and arranged such that the drive shaft 38 thereof projects through the opening 16 in the bowl 14 and into the interior of the volume 28 therewithin. The upper end of the shaft 38 is provided with a rotor mounting spud 40. The spud 40 is configured to accept a rotor R. The interior of the motor housing 36 is in fluid communication with the volume 28 on the interior of the bowl 14, as indicated diagrammatically by fluid passage ports 44 disposed in the upper end bell 36B of the motor 36. Accordingly, vacuum seal 46 is provided to ensure sealed integrity between the end bell 36B of the motor housing 36 and the bowl 14.

The exterior of the bowl 14 is provided with cooling coils 50 which are interconnected in a closed loop refrigerant flow path 52 including an evaporator 54. A temperature sensor arrangement 56 is disposed in the interior of the bowl 14 in a predetermined operative position therewithin such that the temperature of the rotor R received on the spud 40 may be monitored. The position of the temperature sensor 56 is shown only diagrammatically in the FIGURE, it being understood that the sensor may be mounted in any convenient position on the interior of the bowl. In the most preferred instance the sensor is mounted utilizing the support arrangement therefor disclosed and claimed in U.S. application Ser. No. 135,449, filed Dec. 21, 1987 (IP-0698). The output of the sensor is connected to a suitable temperature control network 58 which controls the operation of the evaporator 54 via control line 60.

A vacuum pump diagramatically indicated at reference character 62 is disposed in fluid communication with the interior of the bowl 14 through a line 64. Suitable for use as the pump 62 is a sliding vane rotary vacuum pump as sold by Vacuubrand GmbH and Company of West Germany under the designation Type RS8. A pump control network 66 is operatively associated with the pump 58 to provide pump control signals over a line 68 whereby the pressure level of the interior volume 28 may be controlled.

The drive 36 or motive source for the instrument is preferably a multi-phase brushless dc motor such as that manufactured and sold by Electric Indicator Company, Inc. of Norwalk, Conn. Associated power drive, including a variable voltage source, switching matrix, and commutation control, is provided. A typical example of the power drive for a brushless dc motor is shown in U.S. Pat. No. 3,783,359 (Malkiel) which is hereby incorporated by reference. The motor 36 includes an array of Hall Effect sensors which form a part of the motor commutation control system. The Hall Effect sensors are also used to provide an output representative of the angular velocity of the shaft. This signal, termed the tachometer signal is applied to the instrument speed control system 70 over a line 72.

An operator control panel 80 through which the angular velocity desired by an operator may be input to the speed control 70 is provided. The panel is connected to the speed control via a line 82. The requested speed control signal is also applied over a line 82A to the pump control 66.

The drive spud 40 is configured to accept any one of a predetermined plurality of centrifuge rotors R. Each rotor R is configured for operability in a certain ambient environ,ent within the bowl 14. The primary determinant of the ambient pressure is tha seal configuration of the rotor. Some rotors, such as the GSA Fixed Angle Rotor manufactured and sold by the Medical Products Department of E. I. du Pont de Nemours and Company, Inc., are designed for operation in a non-evacuated or ambient air atmosphere. These rotors are not provided with the seals that would isolate the sample and allow processing in a vacuum environment. Other rotors, such as the F-28/13 Fixed Angle Rotor manufactured and sold by the Medical Products Department of E. I. du Pont de Nemours and Company, Inc., are designed for use in a relatively strong evacuated environment (less than 7500 micron Hg.). These rotors have vacuum seals and mating close toleranced machined surfaces to isolate the sample from the environment. Still other rotors, such as the SS-34 Fixed Angle Rotor manufactured and sold by the Medical Products Department of E. I. du Pont de Nemours and Company, Inc., are designed for operation in a non-evacuated environment contain seals for spill containment. xThese seals, while not capable of providing the sample isolation necessary in a relatively strong evacuated environment (discussed above), would be able to isolate the sample from a partial vacuum environment (e. g., 0.5 atm).

The present instrument is adapted to operate and to spin rotors in either an evacuated or a non-evacuated environment. For this purpose a rotor detection and identification device generally indicated by reference character 88 is provided in a predetermined operating position so as to identify the particular one of the predetermined plurality of rotors able to be used in the instrument. Preferably, the rotor recognition system disclosed and claimed in copending application Ser. No. PCT/US 87/03221 (IP-0651-A) filed Dec. 9, 1987 and assigned to the assignee of the present invention, may be used as the rotor identification means. However, it should be understood that any other suitable rotor recognition device, including a device which decodes or which utilizes and interacts with coded discs provided on the undersurface of the rotor may be used as the rotor identification means.

The output from the rotor identification means is carried over a line 90 to the pump control network 66. Alternatively, the rotor identification means may include operator entry of the identity of the rotor using the operator control panel 80. A signal representative of the identity of the rotor loaded onto the drive spud 40 is carried over a line 90A to the pump control network 66. In one embodiment of the present invention the signal representative of the identity of the rotor mounted onto the drive spud 40, either on line 90 or line 90A, is used to determine the pressure level in which the rotor will be operated. Pump control network 66 is responsive to the signal representative of the rotor identity for controlling the pressure within the bowl at a predetermined level corresponding to the rotor in the bowl. In the preferred implementation the means 66 contains a memory 92. Stored in this memory is a look-up table that associates a predetermined pressure level for each rotor R validly able to be operated by the centrifuge instrument. Again in the preferred case the pressure level is either fully evacuated or non-evacuated. By "fully evacuated" it is meant that the pump is asserted to evacuate the chamber to the extent to which the pump is fully capable (typically in the range 750–7500 micron Hg.).

For example, if the rotor mounted onto the drive spud 40 is identified as being a GSA Fixed Angle Rotor, the corresponding pressure level is non-evacuated (i.e., the pump is not asserted). A suitable control signal to the vacuum pump 62 is output on line 68 to inhibit the operation of the vacuum pump while this rotor is being used to thereby cause the pressure level of the chamber to remain at atmospheric conditions.

As another example, if the rotor mounted on the spud 40 is identified being a F-28/13 Fixed Angle Rotor, the corresponding pressure level of the chamber is fully evacuated. A suitable control signal to the vacuum pump 62 is output on line 68 to assert the vacuum pump while this rotor is used, thus causing the chamber 28 to become evacuated to the level to which the pump is capable.

It should be noted that the instrument may be operated at intermediate pressure levels. To effect such an arrangement the instrument is provided with means such as a servo controlled valve 96 operatively associated with the pump control 66 over a line 98 to effect different levels of vacuum in the chamber 28. This valve could be used to control the amount of leakage into the chamber. Exemplary of a device that could provide this type of control is the Automatic Pressure Controller sold by the Granville-Philips Company of Boulder, Colo. Alternatively a plurality of vacuum pumps with different evacuation levels may be used. In either case the table stored in the memory 92 would list the specific levels of vacuum associated with each rotor.

It should also be noted that the pump control system can be implemented in either an open-loop or a closed-loop fashion. Should closed-loop control be desired, a suitable pressure sensor 99 disposed in communication with the chamber 28 could then be used to monitor the level of vacuum in the chamber 28 and send a signal representative of the pressure in the chamber to the pump control network 66.

In operation of the preferred embodiment the requested angular velocity plays a part in determining the pressure of the chamber. The signal representative of the identity of the rotor mounted onto the drive spud 40, either on line 90 or line 90A, is used in conjunction with a signal representative of the requested final angular velocity ($V_f$) on line 82A to determine the pressure level of the chamber in accordance with the rotor to be used. The look-up table contained in the memory portion 92 of the pump control network 66 stores, for each rotor validly able of being operated in the centrifuge instrument, two predetermined angular velocities: the angular velocity for the rotor above which the chamber 28 must be evacuated during pressure ($V_{ev}$), and the maximum angular velocity at which the rotor is allowed to be rotated ($V_{max}$). If for a given rotor the requested final angular velocity ($V_f$) is less than or equal to the evacuation velocity ($V_{ev}$) and the maximum velocity ($V_{max}$), then the rotor is spun in a non-evacuated environment. A suitable control signal to the vacuum pump 62 is output on line 68 to inhibit operation of the vacuum pump while this rotor is used thereby causing the pressure level of the chamber 20 to remain at atmospheric conditions. If for a given rotor the requested final angular velocity ($V_f$) is greater than the evacuation velocity ($V_{ev}$) and less than or equal to the maximum velocity ($V_{max}$) then the rotor is spun in an evacuated environment. A suitable control signal to the vacuum pump 62 is output on line 68 to assert the vacuum pump during the use of the rotor causing the chamber 28 to become fully evacuated. If for a given rotor the requested final velocity ($V_f$) is ever greater than the maximum velocity ($V_{max}$) an invalid condition has occurred and the requested final velocity ($V_f$) is not accepted. A signal is sent to the operator control panel over line 94 requesting a different requested final velocity ($V_f$).

In the preferred instance, the control network is implemented by a programmable controller utilizing a dual microprocessor arrangement as disclosed and claimed in copending application Ser. No. 137,097, filed Dec. 23, 1987 (IP-0692). The controller has disposed therein, in the preferred case, both a Motorola MC 6809 and a Motorola 6803 microprocessor although it should be understood that any appropriate microprocessor based control system may be used. In this configuration, the Motorola MC 6809 computer system is responsible for obtaining the rotor recognition data and identifying the rotor mounted on the drive spud 40. The MC 6809 computer system also receives the requested final angular velocity from the operator control panel 80.

The MC 6809 computer system, utilizing the signal representative of the identity of the rotor loaded onto the drive spud 40, extracts from a look-up table the evacuation velocity ($V_{ev}$) and the maximum velocity ($V_{max}$) for that rotor. The signal representative of the requested final angular velocity is then compared to these valves in the manner described earlier in order to determine the desired level of pressure for the chamber 28. If evacuation is required the MC 6809 computer system requests the MC 6803 computer system to serve as the pump control to provide vacuum when the run is started. Alternatively, if evacuation is not required, the MC 6809 computer system sends a signal to the MC 6803 computer system representative of the fact. In all cases, the MC 6803 computer system returns a signal to the MC 6809 computer system representative of whether the vacuum system is active or not. The line 94 is asserted, if necessary, by the MC 6809 computer system.

From the foregoing it may be appreciated that the instrument in accordance with the present invention is adapted to rotate a rotor element mounted thereon at a predetermined pressure level, preferably either an evacuated or a non-evacuated environment. This instrument is operative to automatically determine and provide the proper level of pressure in the chamber 28 based on the identity of the rotor mounted onto the drive spud 40 and requested run parameters such as the requested final angular velocity.

Those skilled in the art having the benefit of the teachings of the present invention may impart numerous modifications thereto. It is to be understood, however, that such modifications lie within the contemplation of the present invention as defined by the appended claims.

What is claimed is:

1. A centrifuge instrument comprising:

a framework;

a bowl having a volume defined therein, the bowl being supported on the framework;

a drive motor mounted to the framework, the motor having a drive shaft that projects into the interior of the bowl, the shaft having an upper end thereon, the upper end of the shaft being arranged to accept any one of a predetermined plurality of centrifuge rotor elements thereon;

a pump for evacuating the interior volume of the bowl to a predetermined pressure level;

means for identifying the particular one of the plurality of rotor elements mounted within the bowl and for generating a signal representative thereof; and pump control means responsive to the signal representative of the particular rotor mounted within the blow for controlling the pressure within the bowl at a predetermined level corresponding to the particular rotor.

2. The centrifuge of claim 1 further comprising:

means for generating a signal representative of a predetermined requested angular velocity to which the particular rotor is to be driven;

the pump control means being also responsive to the signal representative of the requested angular velocity to control the pressure level within the bowl.

3. A method for controlling the operation of a centrifuge having a bowl with a volume defined therein, and a pump operable to evacuate the volume, the method comprising the steps of:

identifying the particular one of a plurality of rotor elements mounted within the bowl; and asserting the pump to evacuate the volume to a predetermined pressure level in accordance with the identity of the rotor.

4. The method of claim 3 wherein the pressure level reached during the pump assertion step is also dependent upon the angular velocity to which a rotor disposed in the bowl is to be spun.

* * * * *